(No Model.) 5 Sheets—Sheet 2.

W. B. MANN.
DENTAL CHAIR.

No. 536,814. Patented Apr. 2, 1895.

WITNESSES:
L. I. Van Horn
Charles B. Mann Jr.

INVENTOR:
Wm. B. Mann
By Chas. B. Mann
ATTORNEY.

(No Model.) 5 Sheets—Sheet 3.
W. B. MANN.
DENTAL CHAIR.
No. 536,814. Patented Apr. 2, 1895.
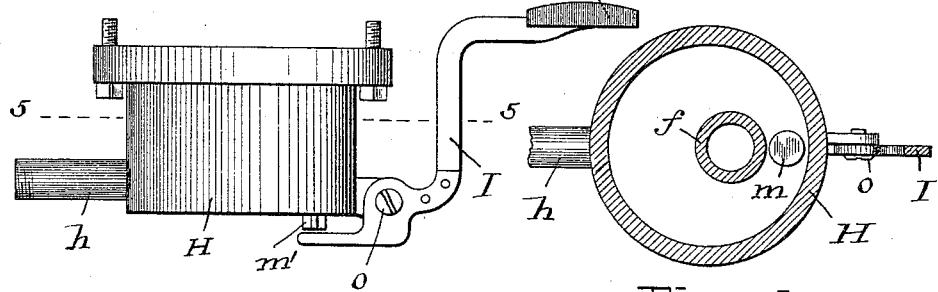
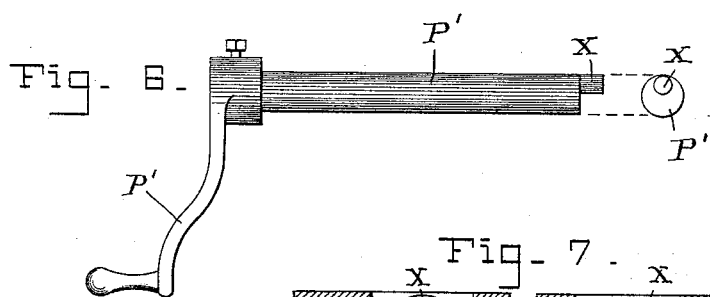
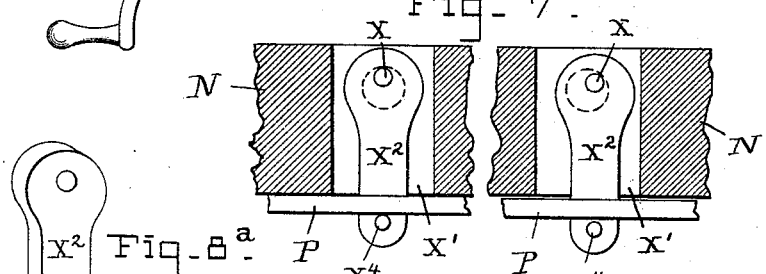
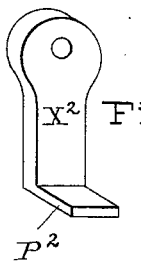
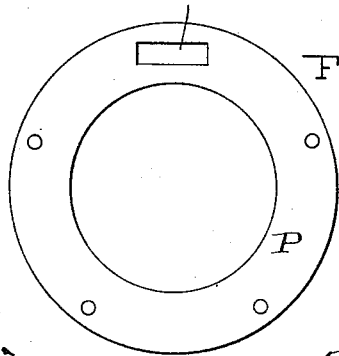
WITNESSES :—
L. I. Van Horn.
Charles B. Mann Jr.
INVENTOR :
Wm B. Mann
By Chas B. Mann
ATTORNEY.

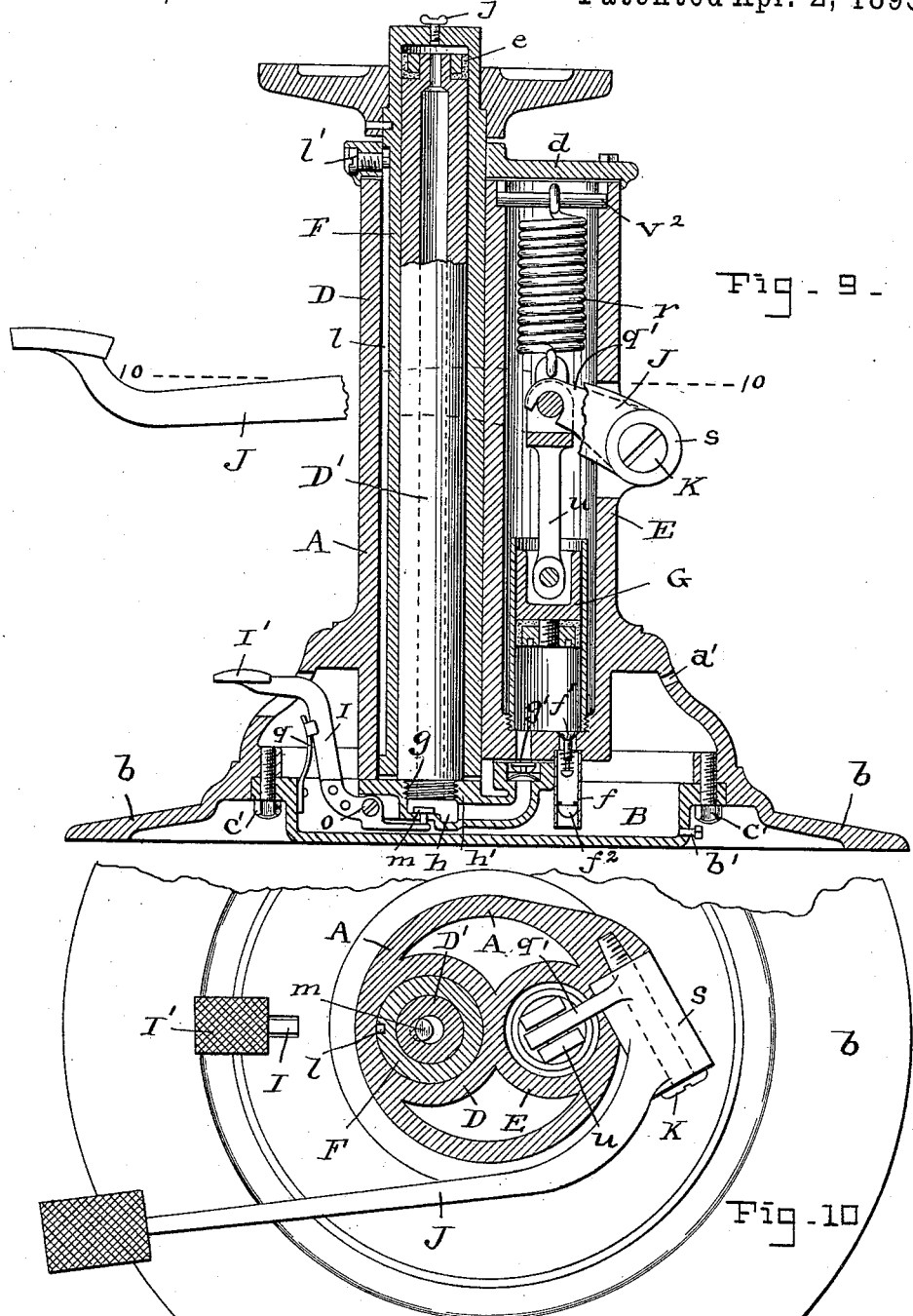

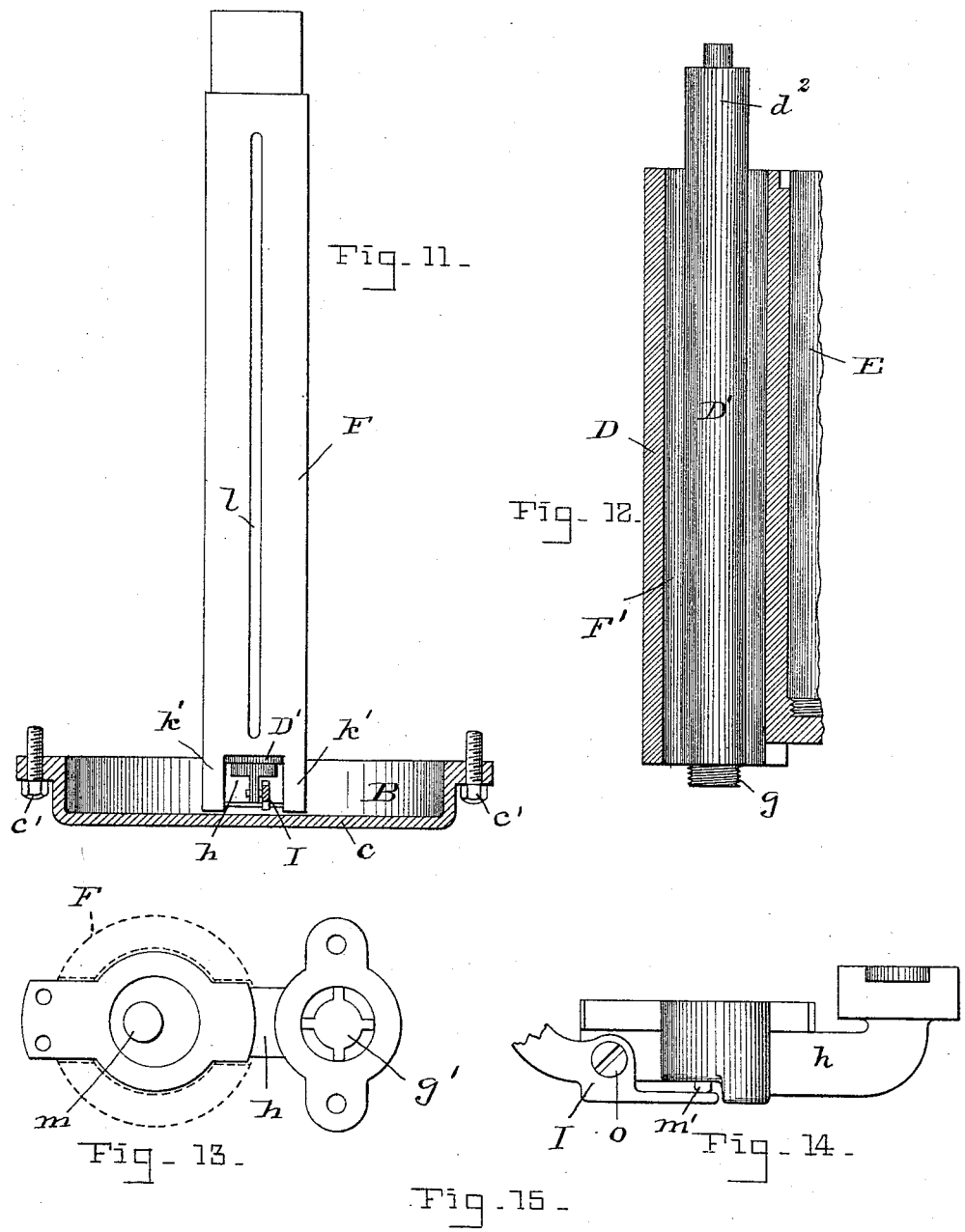
(No Model.) 5 Sheets—Sheet 5.
W. B. MANN.
DENTAL CHAIR.
No. 536,814. Patented Apr. 2, 1895.
WITNESSES:
L. I. Van Horn.
Charles B. Mann Jr.
INVENTOR:
Wm B. Mann
By Chas B. Mann
ATTORNEY.

UNITED STATES PATENT OFFICE.

WILLIAM B. MANN, OF BALTIMORE, MARYLAND, ASSIGNOR OF ONE-HALF TO WILLIAM T. STILLWELL, OF SAME PLACE.

DENTAL CHAIR.

SPECIFICATION forming part of Letters Patent No. 536,814, dated April 2, 1895.

Application filed December 13, 1894. Serial No. 531,630. (No model.)

*To all whom it may concern:*

Be it known that I, WILLIAM B. MANN, a citizen of the United States, residing at Baltimore, in the State of Maryland, have invented certain new and useful Improvements in Dental Chairs, of which the following is a specification.

This invention relates to certain improvements in dental chairs where a fluid column (such as oil) is employed to elevate the chair-body and a pump is employed to impel or force the said fluid.

The accompanying drawings illustrate the improvements which constitute the subject-matter of my invention.

Figure 1:
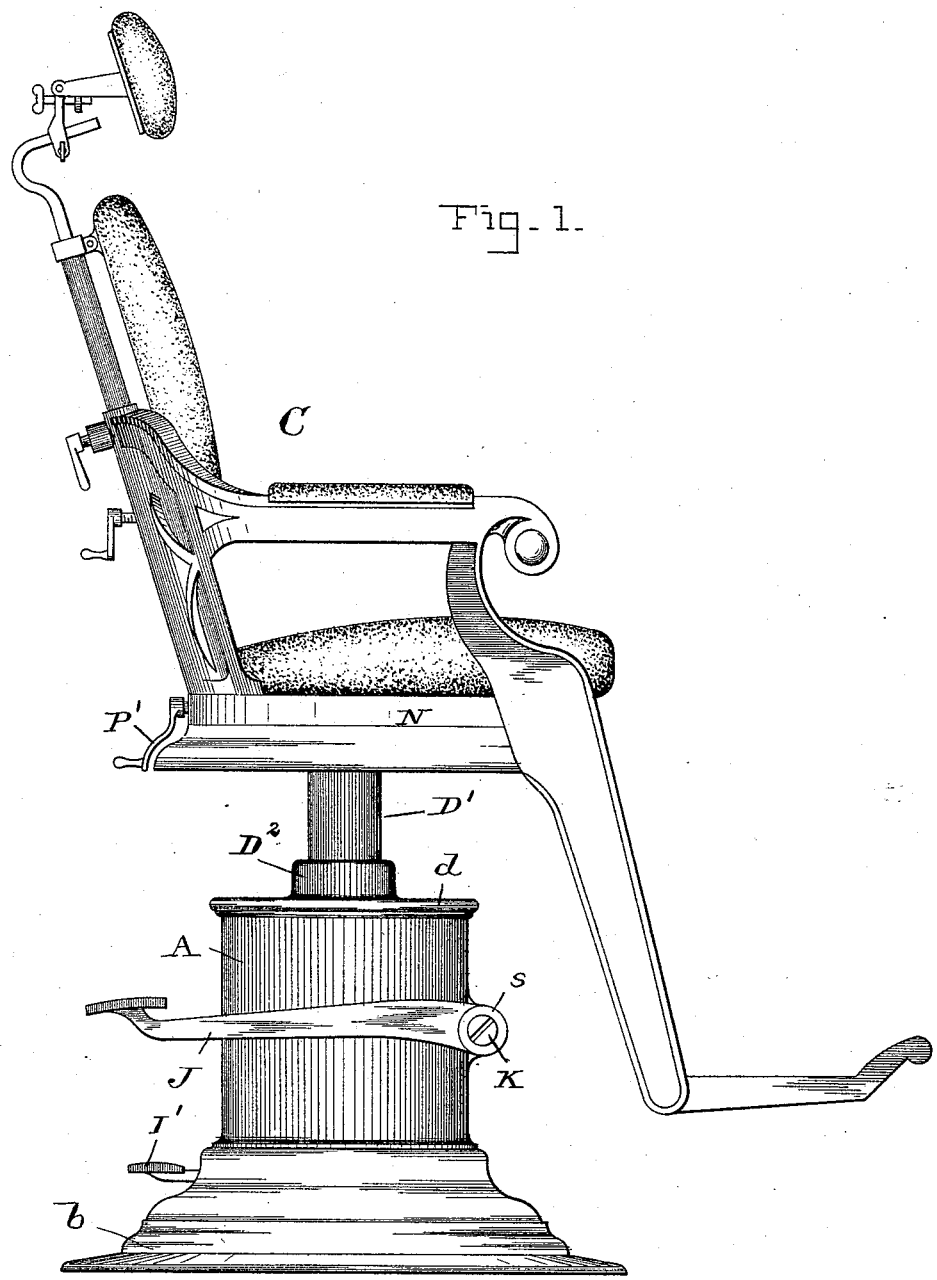
Figure 2:
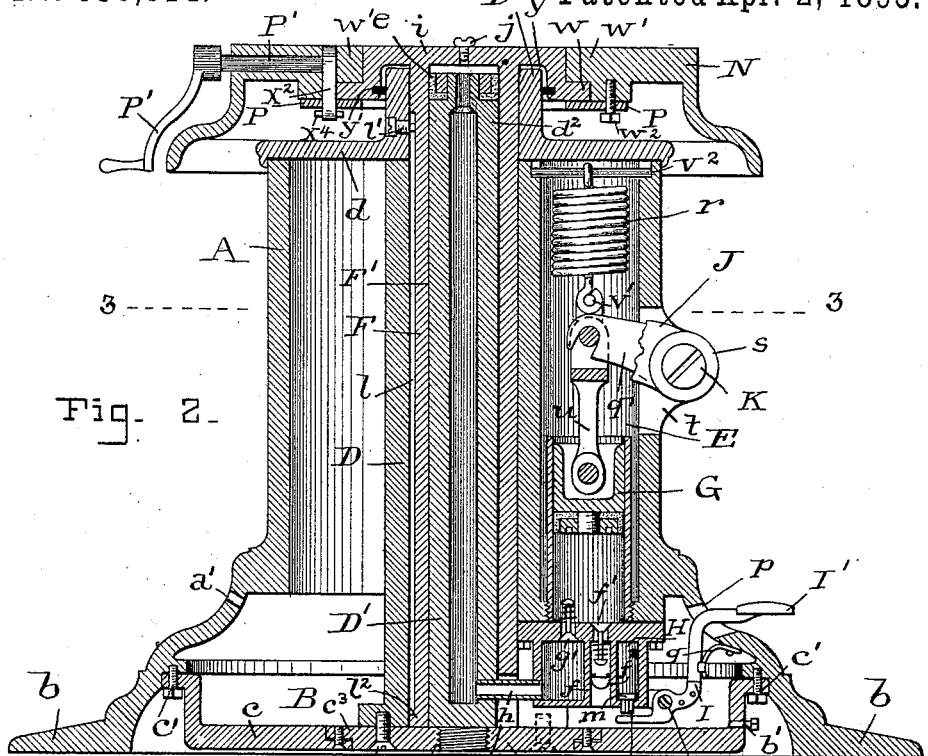
Figure 3:
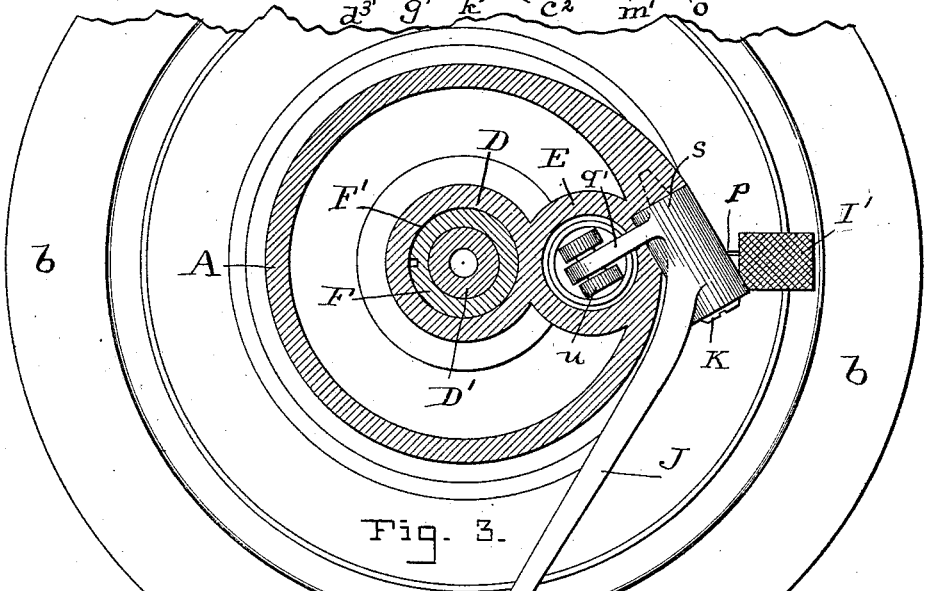

Figure 1 is a side elevation of an ordinary dental chair mounted on and raised by means of my improvements. Fig. 2 is a vertical section of the pedestal and the elevating mechanism and shows the improved construction thereof. Fig. 3 is a horizontal cross-section of the pedestal on line 3—3 of Fig. 2. Fig. 4 is a side view on a larger scale of the valve-chamber and treadle. Fig. 5 is a horizontal cross-section of same. Fig. 6 is a view of the crank-shaft. Fig. 7 shows two views illustrating the action of the link connecting the crank-shaft and ring-plate. Fig. $8^a$ is a modification of the clamp device. Fig. 8 is a plan view of the ring-plate, and Fig. 9 shows a modification and is a vertical section of the elevating mechanism. Fig. 10 is a horizontal cross-section of the base on line 10—10 of Fig. 9. Fig. 11 is a side view of the piston as seen from a transverse direction to the view shown in Fig. 9, and also shows a section of the oil-pan. Fig. 12 is a section of the cylinder and stand pipe with the piston removed. Fig. 13 is a top plan view, on a larger scale, of the passage-way and supply-valve from the pump-cylinder to the base of the piston. Fig. 14 is a side view of the parts shown in Fig. 13 and also showing the lever of the release valve by which the chair-body is lowered. Fig. 15 shows two views of the release valve of the modification.

Referring to the drawings the parts seen in Figs. 1 to 8 inclusive, will first be described.

The pedestal, A, exteriorly is cylindric and is supported on feet or a bell-shaped base or broad rim, b. This base contains an oil-reservoir, B, formed by a bottom pan, c, secured within the hollow base by bolts, $c'$. The lower surface of this plate or pan should, by preference, like the broad base, b, rest upon the floor. The top of the pedestal has a cover plate, d, suitably secured. The pedestal contains two cylinders, D, and E. One of these, D, is for the lifting piston, F, which supports the chair-seat or chair-body, C, and the other, E, is for the pump-piston, G.

Figs. 2, 4 and 5 show the valve-chamber, H, attached to the base of the pump-cylinder, E. A vertical pipe, f, is in this chamber and opens into the pan, c, or oil-reservoir, B. The lower end of this pipe is open having only a strainer, $f^2$, in it to prevent the passage to the pump of any dirt that may be in the oil. A check-valve, $f'$, is at the upper end of this pipe and while allowing oil to pass into the pump-cylinder, prevents its return from the pump-cylinder to the oil-reservoir.

The lower end of the lifting cylinder, D, at the side where it adjoins the pump-cylinder is open and communicates with the oil-reservoir, B. The stand-pipe, D', in Fig. 2 is screwed, at g, into a central plate, $c^2$, of the pan and is stationary. This pipe, D', extends upward through said cylinder, D, and its upper end, $d^2$, projects above the top of the cylinder whereon the cover plate, d, sets. The lower end of this stand-pipe has communication with the valve-chamber, H, which latter communicates from the bottom of the pump cylinder, E. A check-valve, $g'$, allows oil to pass from the pump-cylinder into the valve-chamber and from thence the oil flows by a passage, h, to the stand-pipe, D', but said check-valve prevents oil from returning to the pump cylinder.

The lifting piston, F, is shown in Fig. 2 and is tubular and open at its lower end and slips down over the stand-pipe, D', like a sleeve. It also enters and fits in the cylinder, D, and thus the piston, F, moves up and down in the annular space, F', between the cylinder and stationary-stand-pipe. The upper end of the tubular piston, F, is closed by a head, i, and a vent-hole into the said tube is closed by a removable screw-plug, j, for a purpose hereinafter described. The lower end of the tubular piston has a vertical slot, k, which takes over the passage, h, between the pump-cylinder and stand-pipe, and thus when the piston is fully down its lower end will rest upon the bottom plate or pan, $c$, of the oil-reservoir, thereby availing of the utmost limit of lowering movement and resulting in having the chair-body as low down as possible. On the other hand when the chair-body or seat is elevated to the extreme limit the said slot, $k$, does not interfere with the piston giving effective support to the said body or seat.

The piston, F, itself has no packing to make a tight fit in the cylinder, D, but the upper end of the stand-pipe, D′, has a cup-packing, $e$, which tightly fits in the bore of the tubular piston. The piston has a vertical groove, $l$, on its exterior which, however, does not extend to its ends but stops short thereof, leaving a stop-shoulder, $l^2$, at the lower end of the groove. A lateral pin or screw, $l'$, is in the cover plate, $d$, of the pedestal and the point-end of this screw projects into said groove on the piston. The piston is thus prevented from rotating in the cylinder but is free to raise and lower. The contact of the stop-shoulder, $l^2$, with the screw, $l'$, determines the extreme limit of elevation of the piston.

A release or lowering valve, $m$, is in the chamber, H. This valve opens upwardly against the pressure of the oil in the stand-pipe, D′, and valve chamber, H, and is kept to its seat normally by said pressure. This valve is shown in Figs. 2, 4 and 5. A lever, I, is pivoted by a screw-bolt, $o$, and one end takes under the projecting end of the valve-stem, $m'$. (See Figs. 2 and 4.) The other end of this lever projects through a slot, $p$, in the base and on the exterior has a foot piece, I′. By depressing this foot piece the release valve, $m$, will be opened and oil in the valve chamber, passage, $h$, and stand-pipe, D′, will be discharged into the oil-reservoir, B, and thereupon the piston, F, and chair-body will be slowly lowered. The lowering will be slow because the valve port through which the oil has to discharge is quite small.

A spring, $q$, bears against the valve lever, I, and normally supports it, and prevents it from lifting the release valve, $m$.

The pump piston, G, is depressed or forced down by the lever, J, which is arranged to give great power, and said piston is raised by the retracting spring, $r$. A suitable pivot-pin, K, is fixed horizontally at one side of the pedestal. In this instance it is screwed thereto. The pump lever, J, has its eye, $s$, mounted on this pivot-pin. This lever extends alongside of and past the pedestal to the opposite side. A slot, $t$, is in the side of the pump-cylinder, E, and a short arm, $q'$, is attached to the lever-eye, $s$, and projects through the said slot, $t$, into the cylinder, and a link-bar, $u$, connects between the pump-piston, G, and the said short arm, $q'$. This short arm, $q'$, on the lever, J, is the direct means which forces the pump-piston, G, down. The lifting spring, $r$, has its lower end attached to a pin, $v'$, between two ears on the short arm, $q'$, and its upper end is attached to a cross-pin, $v^2$, which rests in notches at the top of the cylinder, E. The spring, $r$, keeps the pump-piston, G, normally raised. When it is being raised the piston sucks the oil from the reservoir up through the pipe, $f$, and check-valve, $f'$, into the cylinder, E. When the piston, G, is forced down by the lever, J, the oil in the pump-cylinder will be forced through the check-valve, $g'$, and passage, $h$, into the stand-pipe, D′.

The upper end of the non-rotating piston, F, has a head with an L-shaped flange, $w$, which is circular. A chair-seat base, N, has a circular opening at its center provided with an annular flange, $w'$, which is seated on the L-shaped flange, $w$, and is rotatable thereon. To hold the seat-base, N, from rotation I have provided a special device shown in Figs. 2, 6, 7 and 8. A clamp plate, P, is loosely supported by pendent screws $w^2$, below the annular flange, $w'$, so as to be vertically-movable on said screws. This clamp plate, which in Fig. 8 has a ring form, of course revolves with the seat base, N, and takes below the stationary L-shaped flange, $w$, on the piston-head. Now it will be seen that if the clamp ring-plate, P, is raised so as to bear up against the lower surface of the L-shaped flange, $w$, the latter will thereby be clamped and consequently the seat base, N, will be prevented from rotating. To thus raise the clamp plate a crank-shaft, P′, has bearing in the seat-base and its inner end has an eccentric pin, $x$. The seat base, N, has a vertical slot, $x'$, and a link-bar, $x^2$, raises the clamp plate. This link-bar in Fig. 8 has its upper end attached to the eccentric pin, passes down through the slot, $x'$, in the seat base and also through a slot, $x^3$, in the ring-plate, P, and the lower end of this link below the ring-plate has a pin, $x^4$. By a half-turn of the crank, P′, the link-bar, $x^2$, will be either raised or lowered as the case may be. If raised, the ring plate, P, will be raised, as in the left-hand view of Fig. 7, and caused to bear up against the lower surface of the circular head flange, $w$, and clamp it and hold the chair-body from rotating. When the ring-plate is lowered, as in the right-hand view of Fig. 7, the seat base is free to be rotated.

Instead of a link-bar and ring-plate separately constructed, a link-bar, $x^2$, and clamp device, $P^2$, as an integral piece may be used, as in Fig. 8ª.

The central plate, $c^2$, of the pan, $c$, is fitted therein by means of a flange, $c^3$, and screws and, of course, a suitable packing to make the joint oil-tight. By removing the bolts, $c'$, of the pan, the screws in the flange of the central plate, and the screws, $d^3$, through the central plate into the lower end of cylinder, D, all the mechanism may be removed.

The oil-reservoir is supplied with oil at the inlet port, $a'$, and the pan has at one side a hole which is closed by a plug, $b'$. This plug and hole enables all the oil to be drawn out of the pan when it is desired to remove the mechanism from the base.

The vent-hole and plug, $j$, in the top of the piston heretofore referred to, are useful when first charging the chair parts with oil and putting it in operative condition. Before the chair-parts are charged with oil, the stand-pipe and the tubular piston at its closed top contain air. Now when the pump forces oil into the bottom of the stand-pipe, the air referred to is compressed in the upper part of the stand-pipe and as the forcing of oil continues and the piston, F, rises this compressed air would be in the tubular piston and would constitute an elastic cushion on top of the column of oil. The result would be that the chair-body or seat would be mounted on this elastic cushion and instead of being fixed and stable would be yielding and movable—a condition unfit for dental operations. The utility, therefore, of the vent-hole and plug, $j$, is to provide for the escape of all the air contained in the stand-pipe and piston when the oil is being charged or filled into said parts. When full of oil the vent-hole is closed by the plug and the chair is then in operative condition.

The upper head of the piston, F, has on its lower side an annular groove or chamber, $y$, see Fig. 2, provided at one side with a ring packing, $y'$, shown in solid black. The cover plate, $d$, on top of the pedestal has an upward-projecting curb or flange, $D^2$, which is a continuation of the cylinder, D. When the piston, F, and chair-body are fully down the curb or flange $D^2$, fits in the annular groove, $y$, on the piston-head, as shown in Fig. 2.

It will be understood that when the piston and chair-body are lowering, and as they approach the final or lowermost point, this curb or flange, $D^2$, will take into the annular groove which contains air, and as said groove is tight by reason of the packing ring, $y'$, the air is confined in the groove and thus serves as a cushion to produce a soft and easy stop.

Referring to the modification shown in Figs. 9 to 15 inclusive, the pedestal, A, oil-reservoir, B, force pump, E. G. and lever, J, have the same construction and relation as the same parts shown in Fig. 2. The lifting cylinder, D, and pump cylinder, E, in this modification, extend entirely across the interior of the pedestal. The stand-pipe, D', in this case screws into the passage-way, $h'$, which communicates from the pump-cylinder to the stand-pipe. The release valve, $m$, is located in this passage-way, and the lever, I, and its foot-piece, I', open the release valve. The tubular piston, F, in this modification has at its lower end two diametrically opposite terminals, $k'$. When the piston is fully down each of these terminals takes on an opposite side of the passageway, $h$, that is, they sit astride of the passageway. This position is denoted by broken lines in Fig. 13 and fully shown in Fig. 11. By this construction of two terminals the lower end of the piston when down may rest on the bottom of the oil-reservoir, and when up to the limit these terminals fit the cylinder and stand-pipe and serve to give a rigid support to the raised chair-seat. The release valve, $m$, in this case is the same as in Figs. 2, 4 and 5, but the stem is slightly different in construction, having one groove in it instead of a plural number as in the other, and the oil-pan in this case has no separate central plate in its bottom.

From the foregoing description the operation of the chair will be readily understood.

Having thus described my invention, what I claim as new, and desire to secure by Letters Patent, is—

1. In a chair, the combination of a pedestal, A; an oil-reservoir in the base of the pedestal; a cylinder, D, for a lifting piston and inclosed in said pedestal and having its lower end open into the oil-reservoir; a stationary stand-pipe, D', within the said lifting cylinder and forming therein an annular space; a tubular lifting piston, F, fitting in the annular space in said cylinder and having its upper end closed; a pump-cylinder inclosed in said pedestal and communicating with the oil-reservoir; a check-valved communication or passage from the pump-cylinder to the said stand-pipe; and a release valve to allow the oil in the stand-pipe to escape to the oil-reservoir.

2. In a chair, the combination of a pedestal, A; an oil-reservoir in the base of the pedestal with the lower surface of the bottom plate of said reservoir substantially on the same horizontal plane as the lower surface of the feet or rim of the pedestal; a cylinder, D, for a lifting piston and inclosed in said pedestal and having its lower end open into the oil-reservoir; a stationary stand-pipe, D', within the said lifting cylinder and forming therein an annular space; a pump-cylinder inclosed in said pedestal; a check-valved passage from the pump cylinder to said stand-pipe; a tubular piston, E, fitting in the annular space in said lifting cylinder and having its upper end closed and provided at its lower end with a slot which takes over the said passage from the pump-cylinder to the stand-pipe, whereby, when the piston is fully down, its lower end may rest on the bottom plate of the oil-reservoir.

3. In a chair, the combination of a pedestal, A; an oil-reservoir in the pedestal; a stationary lifting cylinder, D, inclosed in said pedestal; a stationary stand-pipe, D', within the lifting cylinder and with the cylinder forming an annular space; a communication from the oil-reservoir whereby oil may enter the lower end of said stationary stand-pipe; a tubular piston fitting in the annular space in said lifting cylinder and having its upper end closed; and a vent-hole in the upper end of said tubular piston—said hole being closed by a suitable plug.

4. In a chair, the combination of a pedestal; an oil-reservoir in the pedestal; a stationary lifting cylinder, D, inclosed in said pedestal; a horizontal cover plate, $d$, on top of the pedestal and setting upon the top extremity of the said cylinder; a stationary stand-pipe, D', within the lifting cylinder and with the cylinder forming an annular space, and having its upper end, $d^2$, projecting above the top of the lifting cylinder and above the said horizontal cover plate; and a tubular piston which slips down over the said stand-pipe and fits in the said annular space in the lifting cylinder.

5. In a chair, the combination of a pedestal, A; an oil-reservoir in the pedestal; a cylinder, D, for a lifting piston and inclosed in said pedestal; a stationary stand-pipe, D', within the said lifting cylinder and forming therein an annular space; a tubular lifting piston, F, fitting in the annular space in said cylinder and having its upper end closed; a pump-cylinder inclosed in said pedestal and communicating with the oil-reservoir; a valve-chamber, H, attached to the base of the pump-cylinder; a check-valved pipe from the oil-reservoir to the pump-cylinder; and a passage or pipe from the said valve chamber to the stand-pipe.

6. In a chair, the combination of a pedestal having a rim or feet the under surfaces of which rest or seat upon the floor; an oil-reservoir formed by a bottom pan secured within the said pedestal and the lower surface of the bottom of which is substantially in the same horizontal plane as the under surface of said rim or feet; a stationary cylinder, D, inclosed in said pedestal; a stationary stand-pipe, D', within the stationary cylinder and forming with said cylinder an annular space; a tubular piston fitting in the annular space and having its upper end closed and having its lower end, when the piston is fully down, resting on the said bottom pan of the oil-reservoir.

7. In a chair, the combination of a pedestal; a non-rotatable vertically-movable piston provided at its upper end with a circular head flange, $w$; a seat-base, N, having an annular flange, $w'$, seated on the said circular head flange and rotatable thereon; a vertically movable clamping device below the said circular head flange; a link-bar to raise the clamp device; and a crank-shaft operating the link-bar.

8. The combination of a chair-body; a pedestal; a cylinder in the pedestal and having at its upper end a curb; a lifting piston attached to the chair-body and having an upper head provided on its lower sides with an annular groove and said groove having a packing ring, $y'$, guarding the entrance to the groove and forming therewith an air-chamber into which latter the said curb enters with an air-tight fit when the chair-body and piston are moving down to the final point, whereby the air in said chamber serves as a cushion when the down movement stops.

In testimony whereof I affix my signature in the presence of two witnesses.

WILLIAM B. MANN.

Witnesses:
   CHAS. B. MANN, Jr.,
   C. CALVERT HINES.